(12) United States Patent
de Araujo Bernardo et al.

(10) Patent No.: US 11,230,908 B2
(45) Date of Patent: Jan. 25, 2022

(54) EQUIPMENT FOR CONNECTION OF SUBSEA LINES

(71) Applicant: FMC TECHNOLOGIES DO BRASIL LTDA, Rio de Janeiro (BR)

(72) Inventors: Leonardo de Araujo Bernardo, Rio de Janeiro (BR); Nicholas Gatherar, Edinburgh (GB); Huei Sun Lai, Rio de Janeiro (BR); Jorge Luiz Da Silva Bonfim, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 0 days.

(21) Appl. No.: 16/768,845

(22) PCT Filed: Nov. 13, 2018

(86) PCT No.: PCT/BR2018/050419
§ 371 (c)(1),
(2) Date: Jun. 1, 2020

(87) PCT Pub. No.: WO2019/104402
PCT Pub. Date: Jun. 6, 2019

(65) Prior Publication Data
US 2020/0332628 A1 Oct. 22, 2020

(30) Foreign Application Priority Data
Dec. 1, 2017 (BR) .......................... 1020170259773

(51) Int. Cl.
*E21B 43/01* (2006.01)
*E21B 33/038* (2006.01)
(Continued)

(52) U.S. Cl.
CPC ............ *E21B 43/01* (2013.01); *E21B 33/038* (2013.01); *E21B 41/0007* (2013.01); *E21B 43/36* (2013.01); *F16K 11/00* (2013.01)

(58) Field of Classification Search
CPC ........ E21B 43/01; E21B 43/36; E21B 33/038; E21B 41/0007; F16K 11/00
(Continued)

(56) References Cited

U.S. PATENT DOCUMENTS

| 4,874,008 A | 10/1989 | Lawson |
| 2012/0085276 A1* | 4/2012 | Openshaw .......... E21B 43/0122 114/257 |
| 2019/0292871 A1 | 9/2019 | Zaragoza Labes et al. |

FOREIGN PATENT DOCUMENTS

| BR | 102014023895 A2 | 5/2016 |
| BR | 102016010696 A2 | 11/2017 |

(Continued)

OTHER PUBLICATIONS

International Search Report issued in corresponding International Application No. PCT/BR2018/050419; dated Mar. 13, 2019 (3 pages).
(Continued)

*Primary Examiner* — Matthew R Buck
*Assistant Examiner* — Patrick F Lambe
(74) *Attorney, Agent, or Firm* — Osha Bergman Watanabe & Burton LLP

(57) ABSTRACT

A subsea equipment includes two manifolds for fluid import and export from oil wells. The first and second manifolds are arranged in parallel and are interconnected by a jumper. The first manifold includes all equipment for field flow control, such as, for example, selection valves, actuators or robot for remote operations and mandrels for connection to the Christmas trees. The second manifold includes only block valves
(Continued)

and mandrels for future interconnection or interconnection to the first manifold.

5 Claims, 2 Drawing Sheets

(51) Int. Cl.
*E21B 41/00* (2006.01)
*E21B 43/36* (2006.01)
*F16K 11/00* (2006.01)

(58) Field of Classification Search
USPC .......................................................... 166/344
See application file for complete search history.

(56) References Cited

FOREIGN PATENT DOCUMENTS

| WO | 0052370 | A1 | 9/2000 |
| WO | 2016044910 | A1 | 3/2016 |
| WO | 2017000051 | A1 | 1/2017 |
| WO | 2017106952 | A1 | 6/2017 |

OTHER PUBLICATIONS

Written Opinion of the International Searching Authority issued in corresponding International Application No. PCT/BR2018/050419; dated Mar. 13, 2019 (3 pages).

\* cited by examiner

EQUIPMENT FOR CONNECTION OF SUBSEA LINES

FIELD OF THE INVENTION

The present invention relates to subsea equipment for connection of lines having more than one flowline, which are used for importing and exporting fluid from well exploration.

BACKGROUND OF THE INVENTION

Subsea lines or pipelines are components responsible for fluid flow between two equipment, such as between two manifolds, or to an offshore production platform, or directly to the shore, wherein the referred fluids may come from production, intended for injection or service on the wells.

Connection (or termination) equipment of these lines (Pipeline End Termination—PLET) is assembled at the end of such subsea lines or pipelines or at intermediate points. This equipment is typically composed of a metal structure for seabed foundation, fluid control and block valve(s), intermediate pipe section and mandrel(s) for connection with other equipment for fluid import or export. In addition, another structure, partially independent of the foundation structure, is required to secure these components as well as to withstand the stresses generated by the line weight during installation.

In a typical subsea architecture, a production manifold is used to collect fluids from the wells by exporting them to line connection equipment (e.g., PLET) through a jumper or spool. FIG. 1 schematically shows a Dual Header manifold, conventionally used by the art. Table I below lists, identifies and quantifies the main components of this equipment.

TABLE I

| Component | Number |
| --- | --- |
| headers (13a) and (13b) | 02 |
| fluid import mandrels (11) | |
| import block/selection valves (12a) for the header (13a) | 06 |
| six import block/selection valves (12b) for the header (13b) | 06 |
| two main passages or headers (13a and 13b) | 02 |
| main pipe block valves (14) | 02 |
| four jumpers or spools (15) (only two depicted), | 04 |
| Jumper connectors (16) (only six depicted), | 08 |
| PLET block valves (17) (only two depicted), | 04 |
| subsea lines or pipelines (18a) (only one depicted) for the flowline (A) | 02 |
| subsea lines or pipelines (18b) (only one depicted) for the flowline (B) | 02 |
| PLETs (19a) and (19b) (only two depicted) | 04 |

As can be seen in the schematic illustration shown in FIG. 1, a system of producing oil collected by a manifold and exported through subsea lines or pipelines requires at least three different equipment (manifold, jumper or spool and PLET), in addition to block valves and connectors, which can represent fluid leakage points to the marine environment.

In addition, these components have numerous parts, such as welded pipe sections, valves, mandrels and a structure strong enough to withstand these components and stresses coming from the lines, which, in a scenario of oil exploration at depths each time more elevated, they become extremely heavy, demanding more of the devices. All of these factors contribute to lengthen the manufacturing process as well as hampering the transport and installation of this equipment.

The present invention is, therefore, an improvement over the equipment revealed by documents BR1020140238956 and BR1020160106966, which deal with a manifold in block architecture also functional for subsea fields having more than one pipeline (dual header or multiple flowlines). However, the equipment structuring according to the present invention is such that it significantly eliminates the amount of equipment installed on the seabed and drastically reduces the installation time of such equipment, a critical factor for the success of the subsea project.

BRIEF DESCRIPTION OF THE INVENTION

The present invention comprises two manifolds (1a) and (1b) for importing and exporting fluids from oil wells. The mentioned manifolds (1a) and (1b) are arranged in parallel and are interconnected by a jumper (8). The manifold (1a) comprises all equipment for field flow control, such as, for example, selection valves, actuators or robot for remote operations and mandrels for connection to the Christmas trees. The manifold (1b) comprises only block valves and mandrels for interconnection to the manifold (1a) or future interconnection with other subsea equipment.

BRIEF DESCRIPTION OF THE FIGURES

The present invention can be well understood from the accompanying illustrative drawings, which, in a schematic form and without limiting the invention, represent.

DETAILED DESCRIPTION OF THE INVENTION

Figure 1:
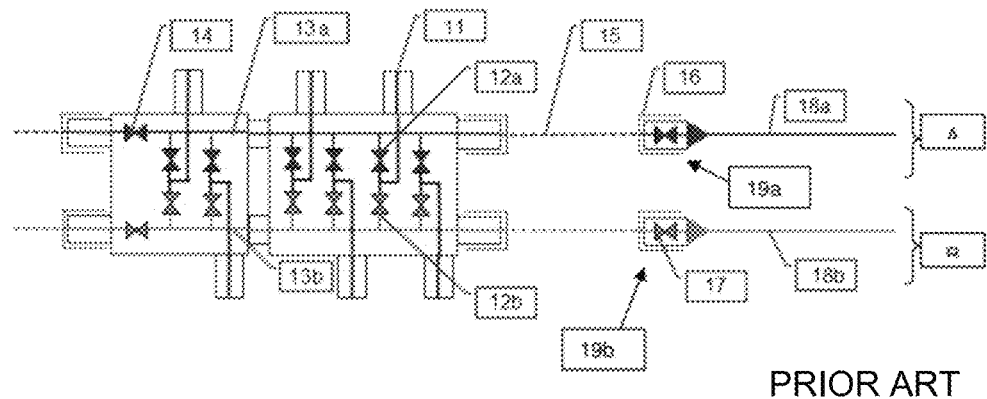
FIG. 1—Typical conventional scheme of connection between manifold (dual header) for six wells and four PLETs (only 2 depicted)
Figure 2:
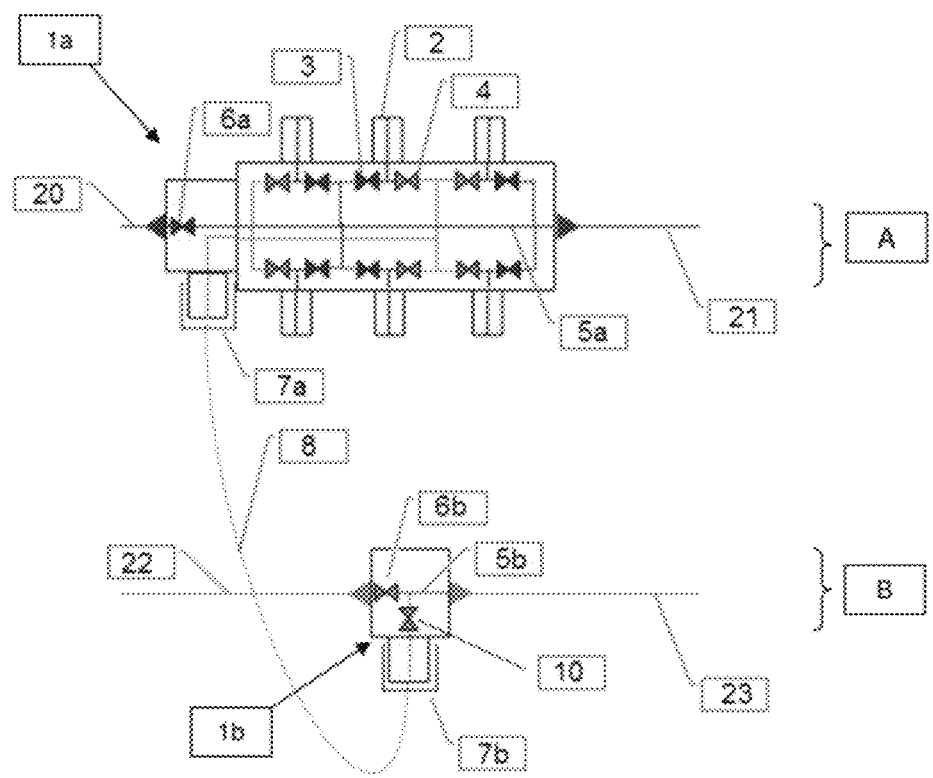
FIG. 2—Simplified diagram illustrating the connection between the manifold for six wells and subsea line or pipeline, according to the present invention.
Figure 3:
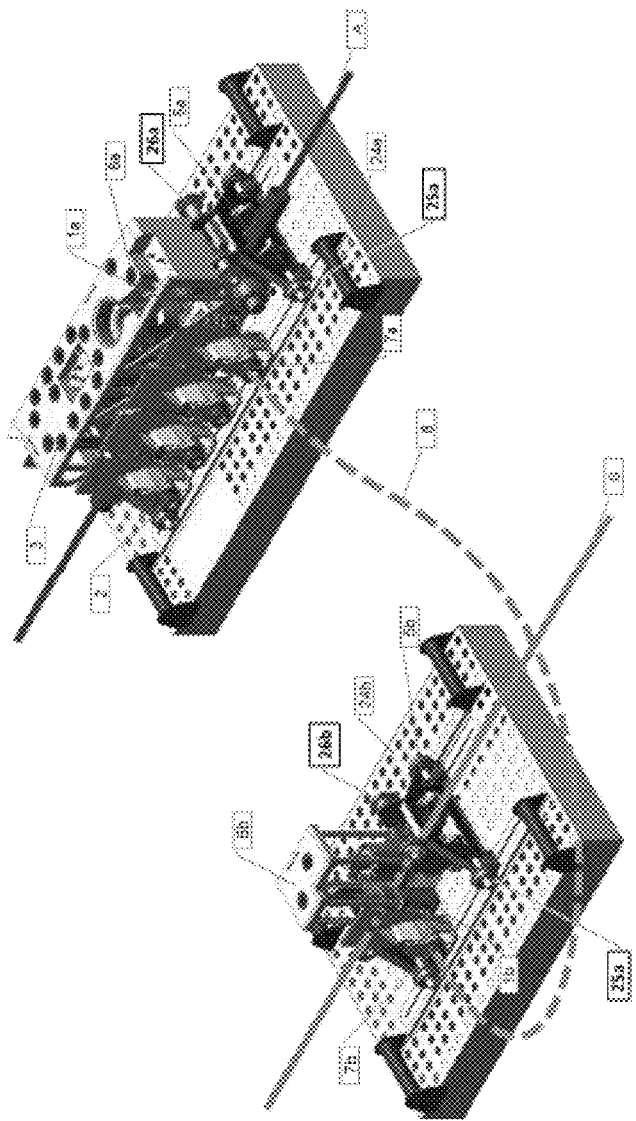
FIG. 3—Perspective view of the manifolds and the main components installed with the line (flowline) for more than one pipeline, according to the present invention.

The present invention, represented by FIGS. 2 and 3, consists of an subsea equipment for connection of subsea lines comprising two manifolds (1a) and (1b) arranged in parallel, that is, contrary to the inline arrangement of the dual headers manifolds of the art (shown in FIG. 1) and manifolds having multiple flowlines.

FIG. 2 shows a simplified scheme of the present invention, wherein the subsea equipment is divided into two manifolds (1a) and (1b), which are interconnected by connection element (8). Said connection element (8) can be a spool or jumper. Manifold (1a) comprises six fluid import mandrels (2), six import block/selection valves (3) for the header (5a), six import block/selection valves (4) for the header (5b), one main passage/header (5a), one block valve (6a) for the header (5a), one interconnection mandrel (7a) and two subsea lines (20) and (21) for the flowline (A). These components are properly interconnected according to their functions in the manifold (1a) set.

In turn, manifold (1b) comprises one main passage/header (5b), one block valve (6b) for the header (5b), one import block valve (10), one interconnection mandrel (7b) and two lines (22) and (23) for flowline (B). As can be seen, these components are also conveniently interconnected according to their functions in the set of the invention.

FIG. 3 represents the perspective view of the equipment according to the present invention, wherein some of the elements, not shown in FIG. 2, can thus be displayed. Thus, the indicated references are the same for the corresponding components of FIG. 2, except when differently referenced.

As can be seen, manifold (1a) inwardly comprises said header (5a) and branches for fluid flow (not referenced). Outwardly, said manifold (1a) comprises a line support point (25a), a subsea installation device (26a), and a foundation (24a).

Manifold (1b) also inwardly comprises the header (5b) and branches for fluid flow (not referenced). Likewise, outwardly, said manifold (1b) contains a line support point (25b), subsea installation device (26b) and a foundation (24b).

The interconnection mandrels (7a) and (7b) have the function of interconnecting the manifolds (1a) and (1b) through a connection element (8), which can be a jumper or spool. Said interconnection mandrels (7a) and (7b) also serve for future expansions of subsea equipment, if necessary.

The equipment configuration according to the present invention, as illustrated in FIG. 2, allows a significant reduction of certain elements when compared to the equipment of the art illustrated in FIG. 1. The reduction of components such as, for example, the connection elements (15), which are used to connect manifolds and PLETs, block valves (17) and jumper connectors (16) consequently results in a reduction in the number of PLETs. Therefore, this configuration makes it possible to decrease potential leak points, in addition to decreasing the amount of equipment installed and substantially reducing the total cost of the system.

It should also be noted that the manifolds (1a) and (1b) are preferably and advantageously produced through a single-block machining process.

Furthermore, the equipment arrangement according to the present invention maintains the same functionality as the prior art equipment, but with more efficiency and significantly lower cost, due to the fact that it allows the use of a reduced number of assembled components and a lower total size, therefore, providing lower weight to the equipment and less time for its installation in the seabed.

Thus, the effects and advantages provided by the subsea equipment, object of the present invention, are numerous and evident to a person skilled in the art, highlighting, among them, the following:
- removal of connection elements from the subsea equipment (jumper or spool), thereby reducing the number of required connectors and pipes;
- reduction in the number of valves in the equipment, since it eliminates the need for block valve in the main pipe (header);
- valve block withstanding greater efforts during line installation, reducing the function of the structure to the foundation only;
- there is no welded component exposed to high line stresses, increasing the equipment's reliability;
- reduction in the number of parts (valves, connectors, mandrels, pipes);
- block architecture allows the production of equipment to serve more wells with lower weight; and
- lower cost to control remote operations in systems having more than one pipeline (dual flowline, for example).

The invention claimed is:

1. A system for connecting subsea lines comprising:
a first manifold and a second manifold arranged in parallel for fluid import and export, wherein:
said first manifold comprises a reduced number of components comprising a first header; six fluid import mandrels; six import block/selection valves for the first header; six import block/selection valves for a second header; only one first main pipe block valve; one first foundation; two subsea lines for a first flowline; one first line support point, one first subsea installation device, one first interconnection mandrel, wherein the first header, the six fluid import mandrels; the six import block/selection valves for the first header; the six import block/selection valves for the second header; the one first main pipe block valve, the subsea installation device, and the one first interconnection mandrel are positioned on the one first foundation, and
said second manifold comprises the second header; only one second main pipe block valve; only one import block/selection valve; two subsea lines for a second flowline; one second foundation; one second interconnection mandrel; one second line support point; and one second subsea installation device, wherein the second header, the second main pipe block valve, the one import block/selection valve, the one second interconnection mandrel, and the one second subsea installation device are positioned on the one second foundation; and
a connection element for directly interconnecting the first interconnection mandrel with the second interconnection mandrel;
wherein the six fluid import mandrels, the six import block/selection valves for the first header, the six import block/selection valves for the second header, the one first main pipe block valve, the two subsea lines for the first flowline, and the one interconnection mandrel of the first manifold are interconnected according to their functions in the first manifold,
and wherein the second header, the one second block valve for the second header, the one import block/selection valve, the two subsea lines for the second flowline, and the one second interconnection mandrel of the second manifold are interconnected according to their functions in the second manifold.

2. The system according to claim 1, wherein the first manifold and the second manifold are machined single-block manifolds.

3. The system according to claim 1, wherein the connection element is a spool or a jumper.

4. The system according to claim 1, wherein the respective first and second headers are flowlines.

5. The system according to claim 1, wherein the subsea lines for the first flowline and the second flowline are subsea pipelines.

* * * * *